United States Patent [19]

Whiteside

[11] 4,103,337

[45] Jul. 25, 1978

[54] DATA TRANSMISSION SYSTEM USING ANALOG TO PULSE WIDTH TO DIGITAL CONVERSION

[75] Inventor: Arliss Eugene Whiteside, Royal Oak, Mich.

[73] Assignee: The Bendix Corporation, Southfield, Mich.

[21] Appl. No.: 742,972

[22] Filed: Nov. 17, 1976

[51] Int. Cl.[2] .................. G06F 3/00; G08B 26/00; G08C 15/00
[52] U.S. Cl. ............................ 364/900; 340/183; 340/505
[58] Field of Search ... 364/200 MS File, 900 MS File; 340/52 F, 147 C, 151, 177 CA, 177 VC, 177 VA, 183, 408; 179/15 BL

[56] References Cited

U.S. PATENT DOCUMENTS

| | | | |
|---|---|---|---|
| 3,132,329 | 5/1964 | Penter | 340/183 |
| 3,538,504 | 11/1970 | Higginbotham | 364/200 |
| 3,566,365 | 2/1971 | Rawson et al. | 364/200 |
| 3,651,454 | 3/1972 | Venema et al. | 340/52 F |
| 3,678,512 | 7/1972 | Fergus | 340/408 |

Primary Examiner—Raulfe B. Zache

Attorney, Agent, or Firm—James R. Ignatowski; Russel C. Wells

[57] ABSTRACT

A data transmission system using analog to pulse width to digital conversion for transmitting data generated by an analog sensor to a digital processor is disclosed. A data request signal generated by the digital processor is gated by a processor interface circuit along a single wire data transmission line to a remote sensor activating both the sensor and its associated interface electronics. The data request signal also provides electrical power to the sensor and sensor interface electronics eliminating the need for separate electrical power leads. The sensor interface electronics after a period of time determined by the value of the analog signal generated by the sensor generates a low impedance to ground signal on the data transmission line. The low impedance to ground signal is detected by the processor interface circuit which terminates the transmission of the data request signal. The processor interface circuit further includes a pulse width to digital converter generating digital data indicative of the duration the data request signal is transmitted. More than one sensor may interface the single data transmission line and each sensor interface may be individually activated by interrogation signals generated by the digital processor.

30 Claims, 21 Drawing Figures

DATA TRANSMISSION SYSTEM USING ANALOG TO PULSE WIDTH TO DIGITAL CONVERSION

BACKGROUND OF THE INVENTION

1. Field of the Invention

The invention relates generally to analog-to-digital converter and data transmission circuits for digital processing systems and, in particular, to analog-to-pulse width-to-digital converter and data transmission circuits which use only a single bi-directional data transmission line between sensor locations and the utilization device.

2. Prior Art

One of the problems in the use of digital processors for high volume low cost control systems is the cost and complexity of equipment needed to enter sensor data into a computer. Two problems are associated with combining analog sensors and digital processors. These are: the conversion of the analog output signals into digital form, and the transmission of data from remote sensors to the digital processor. While data from the sensor to the computer may be transmitted in either analog or digital form, the transmission of data in analog form is prone to be noisy therefore special measures must be taken to avoid serious deterioration of the signal. In many instances these measures are costly and not always effective. The transmission of data in digital form not only requires an analog to digital (A/D) converter at each sensor location, but also requires several data lines from each sensor to the computer. Alternatively, a parallel to serial converter/transmitter may be included at each sensor location and the digital data serially transmitted to the digital processor. Neither analog nor digital transmission principles are well suited for an application requiring reliable and low cost equipment, such as for electronic control units having automotive or similar application. An alternative to either analog or digital transmission is the conversion of the analog signal to pulse width signals at the sensor locations and transmitting the pulse width signals to the digital processor where they are converted to digital form as taught by Chi Sun Lai in U.S. Pat. No. 3,801,834 (April 1974) or R. R. Unterberger in U.S. Pat. No. 2,968,022 (January 1961). The transmitted pulse width signal is much less sensitive to the noise problems associated with analog data transmission and only requires a single transmission line between the sensor location and the computer.

In most applications the computer receives input data from several sensor sources. Normally, this data is received serially from the various sensors in response to interrogation signals as taught by Beck et al in Pat. No. 3,059,228 (October 1962). The method taught by Beck et al, however, requires at least one extra lead to each sensor location for interrogation purposes. The requirement for the extra interrogation leads to each sensor location may be eliminated as taught by R. W. Fergus in U.S. Pat. No. 3,678,512 (July 1972). The telemonitoring systems taught by Fergus uses a single bi-directional data transmission line for transmitting interrogation signals and data back and forth between the sensor locations and a digital processor. Each sensor location contains an analog to pulse width converter and a pulse counter which counts interrogation pulses on the bi-directional line and activates the analog to pulse width converter each time a predetermined number of pulses have been counted at each sensor location. The analog to pulse width converter extends the time duration of the interrogation pulse. This extended pulse signal is transmitted back to the digital processor via the bi-directional line. The Beck system also transmits a reset signal to the pulse counters at each sensor location. The reset signal has a polarity opposite the interrogation signal and sets the counter at each sensor location to zero prior to initiating the interrogation pulse sequence.

The disclosed system is an improvement over the prior art discussed above.

SUMMARY OF THE INVENTION

The invention is a low cost solution to both the transmission and analog to digital conversion problems associated with the use of digital processors in control systems having analog sensors. The system embodies circuitry at the digital processor for transmitting a computer generated data signal which activates a selected sensor. This data signal also provides electrical power to the sensor and its associated sensor interface electronics. The sensor interface electronics embodies an analog to pulse width converter which generates a low impedance to ground signal on the data transmission line after a time interval indicative of the value of the analog signal generated by the sensor. The low impedance to ground signal is detected by processor interface circuitry and terminates the transmission of the data signal. The transmitted data signal is used to gate clock pulses to a counter which generates digital data indicative of the period during which the data signal was transmitted. Decoder circuits in each sensor interface electronics permit each sensor and its associated analog to pulse width converter to be individually activated in response to interrogation signals generated by the digital processor. Because the electrical power is supplied to the sensor and its interface electronics by the data signal, separate electrical leads for supplying electrical power are eliminated, One objective of the invention is a data transmission system using analog to pulse width to digital conversion using a single data transmission line.

Another objective of the invention is a data transmission system in which the electric power for the sensor and its associated interface electronics is supplied by the interrogation and data signals transmitted along the single data transmission line.

Another objective of the invention is a data transmission system in which the signal providing electrical power to the sensor and sensor interface electronics also carries the data information.

Another objective of the invention is a data transmission system in which the pulse width of the signal providing electrical power to the sensor and the sensor interface electronics is converted into digital data indicative of the value of analog signal generated by the sensor.

These and other advantages will become apparent from the drawings and following specification.

DETAILED DESCRIPTION OF THE PREFERRED EMBODIMENT

Figure 1:
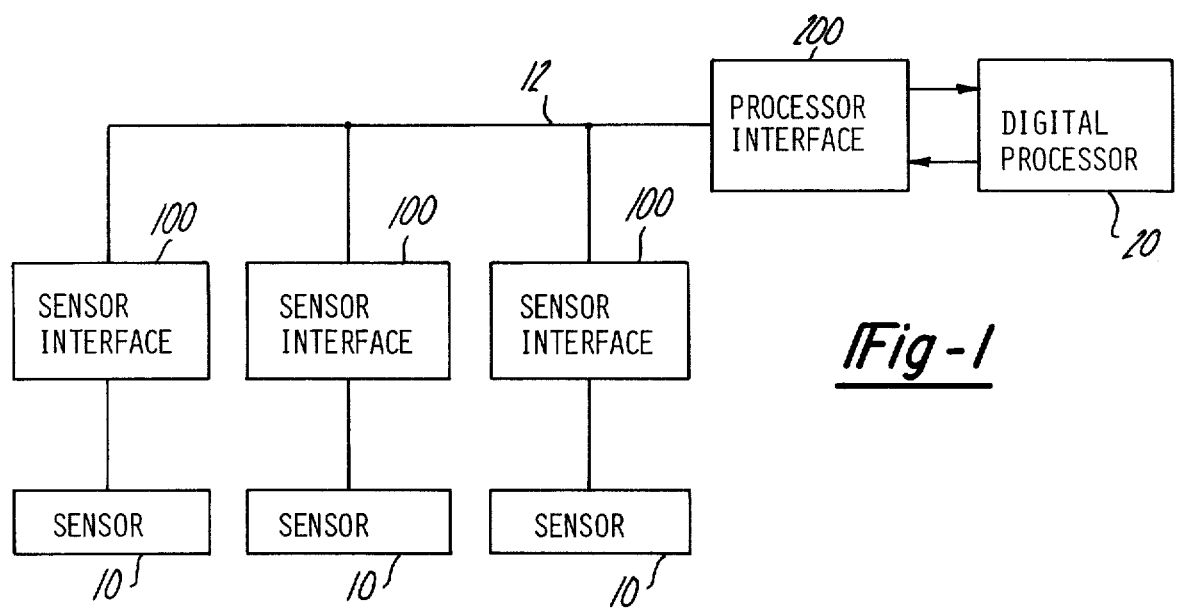
FIG. 1 is a block diagram illustrating the basic elements of the disclosed data transmission system and their inter-relationship.

The basic elements of the data transmission system are shown in the block diagram illustrated in FIG. 1. A plurality of Sensors 10 disposed at locations remote from a Digital Processor 20 generate analog signals indicative of sensed conditions. The sensed conditions may be temperature, pressure, fluid flow, acceleration, strain, torque or any other parameter which is to be used by the Digital Processor in the performance of its specified function. The Digital Processor 20 may be used for any number of purposes, such as controlling an automated device, controlling the fuel delivery to an internal combustion engine, performing mathematical computations or any other use as is known in the art. The Digital Processor 10 has a companion Processor Interface 200 controlling the data flow between the Digital Processor 20 and a single data Line 12 and each Sensor 10 has a companion Sensor Interface 100 controlling data flow between sensors 10 and the single data Line 12. When the Digital Processor requires data indicative of a particular parameter, it sequentially generates an interrogation signal which indentifies the Sensor 10 which is detecting the particular parameter and then generates a data signal. The Processor Interface 200 transmits the generated interrogation signal to each Sensor Interface 100. The Sensor Interface associated with Sensor 10 detecting the particular parameter is activated by the interrogation signal and generates a pulse width signal on Line 12 in response to the data' signal. The pulse time interval of the generated pulse width signal is indicative of the value or magnitude of the analog signal generated by the sensor. The pulse width signal is detected by the Processor Interface and converted to digital form for utilization by the Digital Processor 20. As is known, the Digital Processor 20 may generate the interrogation signals when specific sensor data is needed or it may generate interrogation signals activating each Sensor Interface in a predetermined sequence at routine intervals. The order or sequence in which the interrogation signals are generated by the Digital Processor is immaterial to the invention.

Figure 2:
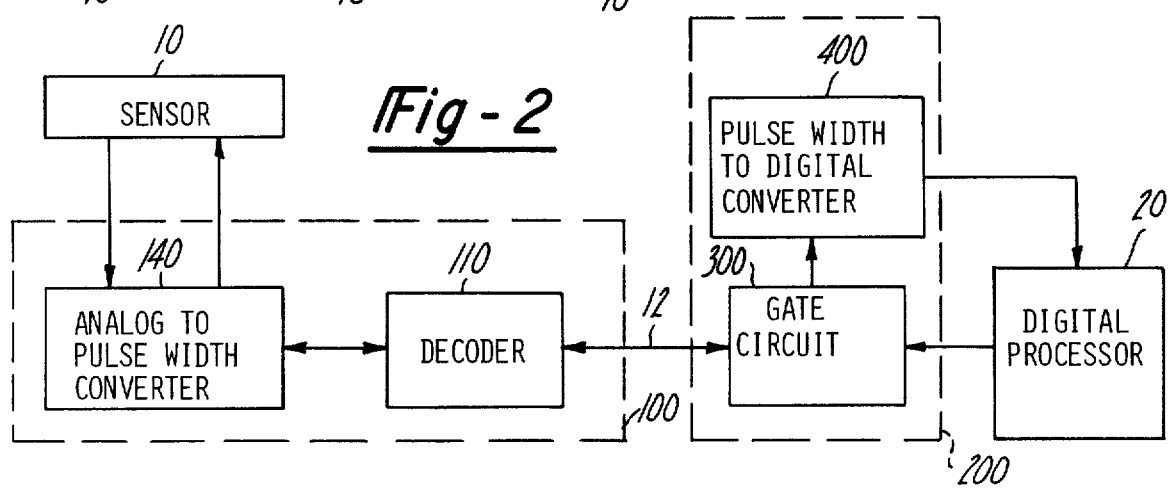
FIG. 2 is a block diagram showing subcomponents of the preferred embodiment.

The data transmission system is shown in greater detail in the block diagram of FIG. 2. To simplify the block diagram only one Sensor 10 and one Sensor Interface 100 are shown. The Digital Processor 20 generates an interrogation signal which is passed by a Gate Circuit 300 in the Processor Interface 200 to the single transmission Line 12. The interrogation signal may be coded in any of the various ways known in the art, such as a number of short pulses, single pulses of predetermined durations or a binary coded pulse sequence where the width of the pulses or the gaps between pulses are indicative of binary ONE's or ZERO's.

The coded interrogation signal received by a Decoder 110 places the Sensor Interface 100 in a standby state. The computer then generates a data signal having a duration longer than the maximum pulse duration of any pulse width signal generated by analog to pulse width converters 140 in the system. The data signal is transmitted to the Line 12 and to a Pulse Width to Digital Converter 140 by Gate 300 and Decoder 110. The pulse Width Circuit 400 starts converting the data signal to digital data. The data signal transmitted via Line 12 to the Sensor Interface 100 activates the Decoder 110 which was placed in the standby state by the proceeding interrogation signal. After a period of time, determined by the magnitude of the analog signal generated by the associated Sensor 10, the analog to pulse width Converter 140 generates a low impedance to ground signal on Line 12 through Decoder 110. The low impedance to ground signal on Line 12 is detected by the Gate Circuit 300 and terminates the data signal being transmitted to the Pulse Width to Digital Converter 400 which now stores digital data indicative of the time the data signal was received. The digital data stored in the Pulse Width to Digital Converter 400 is transmitted to the Digital Processor 20; this digital data is a function of the duration of the data signal on Line 12 and indicative of the value of the analog signal generated by the Sensor 10.

By this means Digital Processor 10 may interrogate each sensor in the data transmission system and receive in return a digital signal indicative of the value of the analog signals being generated by the sensors.

Figure 3:
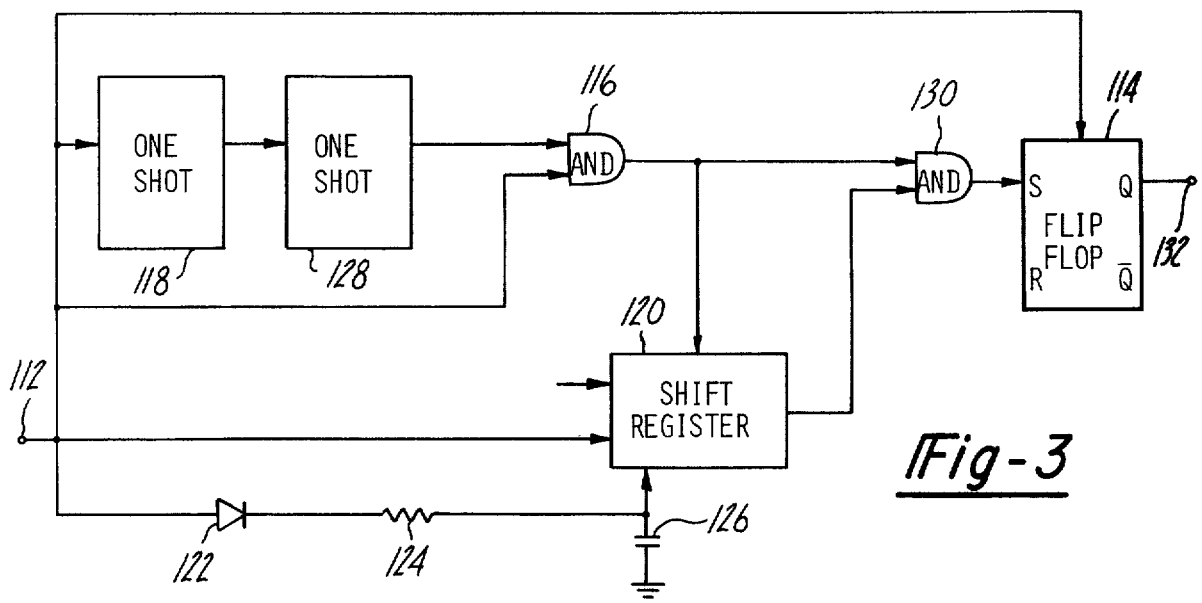
FIG. 3 is a circuit diagram of a decoder shown in block form on FIG. 2.

The details of a Decoder 110 capable of performing the desired functions are discussed with reference to the circuit diagram of FIG. 3. The circuit is designed to respond to an interrogation signal having a predetermined number of short pulses generated by the Digital Processor 20 followed by a data signal for a predetermined time which is longer than the pulse duration of the pulse width signals generated by the analog to pulse width Converter 140 in the data transmission system. The interrogation pulse signals are received at an input terminal 112. Terminal 112 is connected to the power input terminal of a flip flop multivibrator 114, an input of AND gate 116, the input of a One Shot Multivibrator 118, the shift input of shift register 120 and a series connected diode 122 and resistance 124. The opposite end of resistance 124 is connected to the power input terminal of the shift register 120 and to a capacitance 126. Electrical power to the shift register 120, and the other elements of the circuit with the exception of the Flip Flop 114 is provided through diode 122 and resistance 124 when pulse signals are present at input terminal 112. The capacitance 126 stores a portion of the electrical power transmitted by diode 122 and resistance 124 and is used to power the shift register 120 and other elements in the intervals between the interrogation pulse signals. Flip Flop 114 only receives power when either interrogation or data signals are present at terminal 112.

The output of the One Shot Multivibrator 118 is connected to the input of a second One Shot Multivibrator 128 and the output of Multivibrator 128 is connected to an input of AND gate 116. The output of the AND gate 116 is connected to an input of the shift register 120 and sets the first bit in the shift register 120 to a logic ONE (positive potential) and the remaining bits to a logic zero (ground potential). The output of AND gate 116 and the output of the shift register 120 are connected to alternate inputs of AND gate 130. The output of AND gate is connected to the "SET" input of Flip Flop 114 and the Q (SET) output of Flip Flop 114 is connected to output terminal 132.

Figure 4:
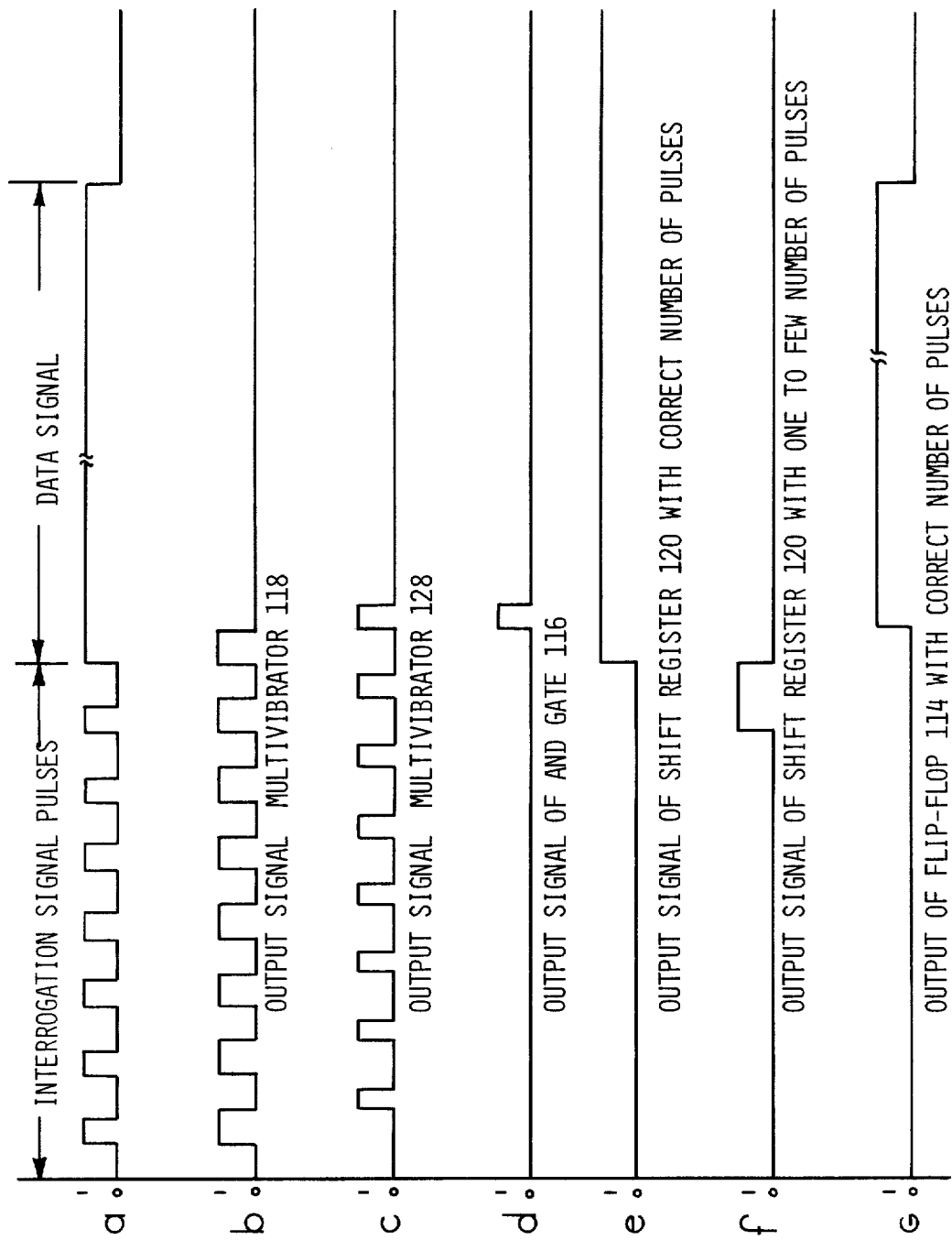
FIG. 4a is a waveform showing the time sequence of the interrogation signals and the data signal received at terminal 112 of FIG. 3.
FIG. 4b is a waveform showing the output signal generated by the first shot multivibrator 118 of FIG. 3.
FIG. 4c is a waveform showing the output signal generated by the second one shot multivibrator 128 of FIG. 3.
FIG. 4d is the output of AND gate 116 of FIG. 3.
FIG. 4e is the output of shift register 120 when it receives the correct number of pulses.
FIG. 4f is the output of shift register 120 when it receives an incorrect number of pulses.
FIG. 4g is the output of Flip-Flop 114 when placed in the SET state by the signal from AND gate 116.

The operation of the decoder 110 is as follows: The shift register 120 starts with a logic ONE stored in its first storage location while the remaining storage locations contain a logic ZERO. The leading edges of interrogation pulses (FIG. 4a) appearing at input terminal 112 shift the stored logic ONE through the shift register until, after a predetermined number of pulses, the logic ONE is stored in the last storage location and activates an input of AND gate 130. If the number of pulses is correct the output of the shift register 120 remains a logic ONE, as illustrated in FIG. 4e; however if the number of pulses are incorrect, the logic ONE is terminated with the next pulse as shown in FIG. 4f. The leading edges of each pulse appearing at terminal 112 also activate one shot multivibrator 118 which produces a pulse signal which has a pulse duration slightly longer than the short pulses used in the interrogation signal as shown on FIG. 41b. The trailing edge of the pulse generated by multivibrator 118 triggers multivibrator 128 which produces a short pulse having a pulse duration less than the time interval between interrogation pulses. The output pulses of multivibrator 128 are generated in the interval between the interrogation pulses as shown in FIG. 4c. The interrogation pulses and the output of multivibrator 128 are applied to alternate inputs of AND gate 116. As long as interrogation pulses are received, one input to AND gate 116 will always be a logic ZERO, and no output will be produced. However, when the longer data signal pulse is received, both inputs to AND gate 116 will be a logic ONE, and AND gate 116 will output a logic ONE to an input of AND gate 130 and to an input of the shift register 120 as shown on FIG. 4d. If the logic ONE data bit previously inserted into the shift register is now in the last storage location, AND gate 130 will be activated by the logic ONE pulse output from AND gate 116 and produce an output signal which is applied to the SET input of Flip-Flop 114. Flip-Flop 114 is switched to the SET state and produces a logic ONE output at the Q output connected to terminal 132 as shown in FIG. 4g. Simultaneously with the setting of Flip-Flop 114, the input to the shift register from AND gate 116 places a logic ONE data bit in the first storage location of shift register 120.

Flip Flop 114 remains in the SET state until the data signal is terminated by the gate circuit 300 in response to a low impedance ground signal. Termination of the data signal on terminal 112 removes power from Flip Flop 114, causing it to reset. When power is reapplied to Flip Flop 114 from input terminal 112, it assumes the reset state and remains in that state until switched to the SET state by a signal from AND gate 130, as previously described. If the interrogation signal contains more or less pulses than the number of storage locations in shift register 120 minus 1, the output of the shift register will be a logic ZERO when the output of gate 116 is a logic ONE and AND gate 130 will not set Flip Flop 114.

In an alternate interrogation code, the first interrogation pulse may be a slightly longer pulse causing AND gate 116 to insert a logic ONE in the first storage location of the shift register and the second logic ONE from AND gate 116, produced in response to the data signal, could be used to clear the register. In this case, the proper interrogation signal contains a number of short pulses which is the number of storage locations in shift register 120 minus 2.

Figure 5:
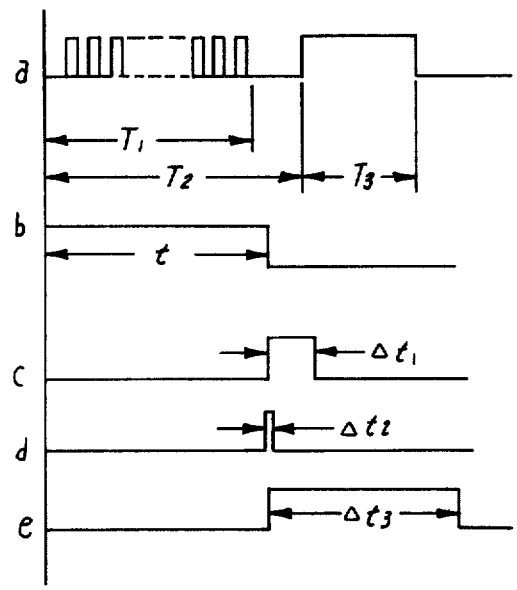
FIG. 5a is a waveform showing the time sequence of the interrogation signals and the data signals received at terminal 112 of FIG. 3.
FIG. 5b is a waveform showing the output signal generated by the first one shot multivibrator 118 of FIG. 3.
FIG. 5c is a waveform showing the output signal generated by the second one shot multivibrator 128 of FIG. 3.
FIG. 5d is a waveform showing the output of the second multivibrator illustrated in FIG. 8.
FIG. 5e is a waveform showing the output generated by the second multivibrator illustrated on FIG. 9.

The Decoder 110 may have an alternate mode of operation as follows: The shift register 120 has a logic ONE stored in its first storage location while the remaining storage locations contain a logic ZERO. The leading edge of the interrogation pulses FIG. 5a appearing at input terminal 112 shift the stored logic ONE through the shift register until after a predetermined number of pulses, the logic ONE is stored in the last storage location activating an input to AND gate 130. The leading edge of the first interrogation pulse signal at terminal 112 also activates One Shot multivibrator 118 which produces a pulse signal having a pulse duration t which is slightly longer than the time interval $T_1$ required for the Digital Processor 20 to generate the interrogation signal but shorter than the time interval "$T_2$" preceding the generation of the data signal by the Digital Processor 20 as shown in FIGS. 5a and 5b. The trailing edge of the pulse generated by multivibrator 118 triggers multivibrator 128 which produces a pulse having a pulse duration "$\Delta t_1$" as illustrated in FIG. 5c such that $t + \Delta t_1$ is slightly longer than the time interval "$T_2$". The output of multivibrator 128 is applied to an input of AND gate 116. AND gate 116 is now in a standby state awaiting the generation of the data signal by the Digital Processor. The data signal appearing at input terminal 112 is applied to the alternate input gate of AND gate 116 and AND gate 116 is activated to produce an output signal which is applied to an input gate of AND gate 130 and to an input of shift register 120. If the logic one data bit previously inserted into the shift register 120 is in the last storage location, and applied to the alternate input of AND gate 130, AND gate 130 is activated and produces an output signal which is applied to the SET input of Flip Flop 114. Flip Flop 114 is now powered by the data signal and is switched to the SET state and produces a positive output at the Q output connected to terminal 132. The input to the shift register from AND gate 116 places a logic ONE data bit in the first storage location.

Flip Flop 114 remains in the SET state until the data signal is terminated or a ground or low impedance signal is generated at terminal 132. When power is first applied to Flip Flop 114 from input terminal 112 it assumes the reset state and remains in that state until switched to the SET state by a signal from AND gate 130. AND gate 130 will only apply a signal to the "SET" input of Flip Flop 114 upon the simultaneous occurrence of an output from AND gate 116 and a logic one data bit in the last storage location in the shift register 120. Since AND gate 116 is blocked by the action of One Shot multivibrators 118 and 128 during the generation of the interrogation pulse signals, AND gate 116 can only activate AND gate 130 during the occurrence of the data signal. Likewise, if the interrogation signal contains more or less pulses than the number of storage locations in the shift register 120 minus one (1) the output of the shift register will be a logic ZERO and AND gate 130 will not produce an output when it receives an input signal from AND gate 116.

It is acknowledged that a person skilled in the art could design comparable Decoders producing the same functions in response to other types of interrogation signals such as interrogation signals having predetermined pulse widths or binary encoded interrogation signals.

Figure 6:
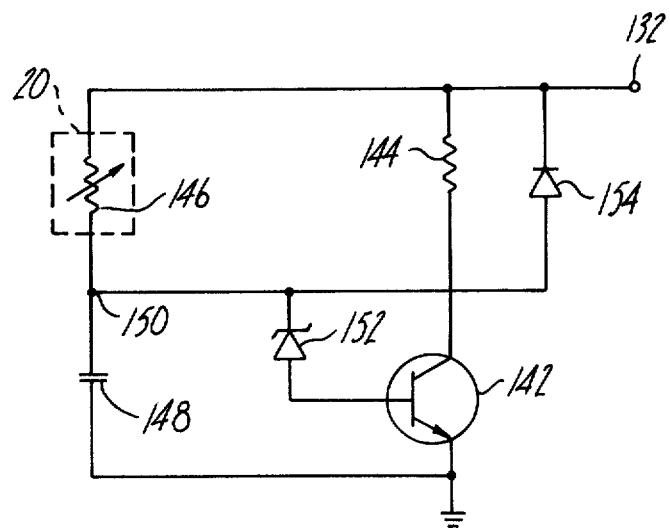
FIG. 6 is a circuit diagram of the analog to pulse width converter.

The details of an Analog to Pulse Width Converter 140 are illustrated in the circuit diagram of FIG. 6. The input power is received at terminal 132 which is the same as the output terminal of the Decoder 110. The collector of transistor 142 is connected to terminal 132 (or directly to terminal 112) through a resistance 144 and the emitter of transistor 142 is connected to a ground potential. The sensor 20, illustrated as a variable resistance 146, is connected between the input terminal 132 and one electrode of an integrating capacitance 148. The other electrode of capacitance 148 is connected to ground. The base of transistor 142 is connected to the junction 150 between the sensor 20 and capacitance 148 by means of a zener diode 152, as shown. Junction 150 is also connected to the input terminal 132 by means of a diode 154.

The operation of the Analog to Pulse Width Converter 140 is as follows: Prior to the application of electrical power to terminal 132 by the Decoder 110, terminal 132 is at ground potential and capacitance 148 is discharged to ground potential by means of diode 154. When power is applied to terminal 132, diode 154 is reverse biased and blocked. Current starts to flow through variable resistance 146 (Sensor 20) and starts to charge capacitance 148 at a rate inversely proportional to the resistance of the Sensor 20 which is a function of the sensed condition. The potential across capacitance 148 increases until the potential at junction 150 reaches the breakover potential of zener diode 152 which is connected to ground through the base to emitter connection of transistor 142. When the potential at junction 150 reaches the break over potential, zener diode 152 starts to conduct providing a base current flow in the transistor placing it in the conductive state. The impedance of the serially connected resistance 144 and transistor 142 is lowered resulting in an increased current flow. The increased current flow is reflected in the current flow on Line 12 which is detected by the Processor Interface and the data signal on Line 12 then is terminated. By this means the duration of the data signal is a pulse width signal indicative of the resistance of Sensor 20 and a value of the sensed condition.

Figure 7:
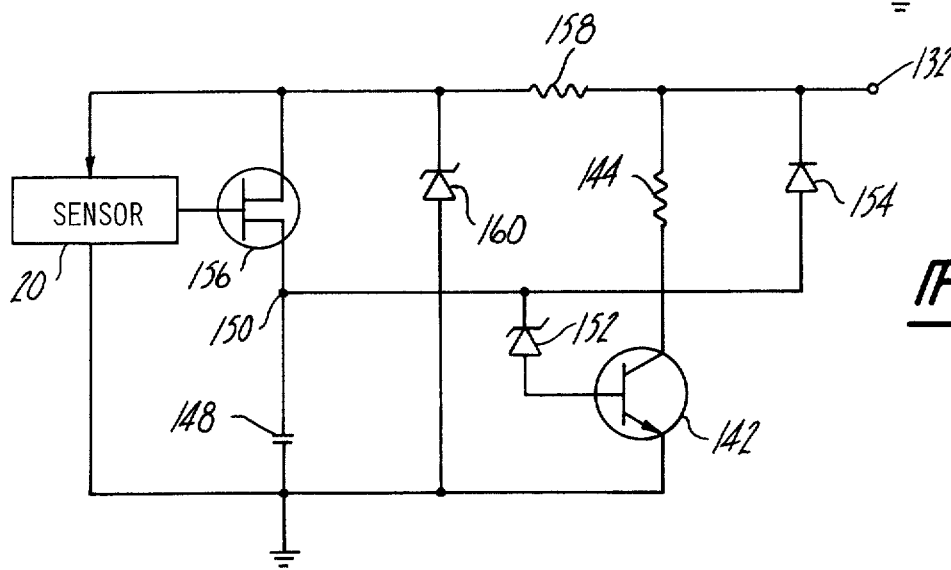
FIG. 7 is an alternate embodiment of the analog to pulse width converter.

An alternate embodiment of the Analog to Pulse Width Converter 140 is shown in the circuit diagram illustrated in FIG. 7. In this alternate embodiment the Sensor 20 produces an analog signal which is applied to the gate electrode of an FET transistor 156 having its source electrode connected to terminal 132 through a resistance 158 and the drain electrode is connected to junction 150. A zener diode 160 is connected between the junction of resistance 158 and the source electrode of FET transistor 156 and ground potential. The resistance 158 and zener diode 160 form a voltage regulator, regulating the potential applied at the source electrode of FET transistor 156. It is recognized that resistance 158 and zener diode 160 may also be included in the circuit illustrated in FIG. 6 between the variable resistance 146 and the terminal 132 to provide the same function. Referring back to FIG. 7, the remaining elements of the circuit which are the same as those illustrated in FIG. 6, and provide the same function, have the same identifying indicia.

The operation of the circuit illustrated in FIG. 7 is basically the same as discussed with reference to FIG. 6. Briefly, when the potential at terminal 132 is a ground potential capacitance 148 is discharged. The application of electrical power to terminal 132 provides electrical power to the collector of transistor 142 through resistance 144, and regulated power is provided to FET transistor 156 and Sensor 20 through resistance 158. The Sensor 20, in response to the applied power generates an analog signal indicative of the sensed condition which is applied to the gate electrode of FET transistor 156. The analog signal applied to the gate electrode of transistor 156 controls the charge current flow to capacitance 148. When the charge on capacitance 148 equals the break over potential of zener diode 152, transistor 142 conducts lowering the impedance of the circuit to ground and increasing the current flow of the data signal on Line 12 which is detected by Processor Interface 200.

It is recognized that other analog to pulse width converter circuits could be devised by a person skilled in the art which could provide the same functions discussed with reference to FIGS. 6 and 7.

Figure 8:
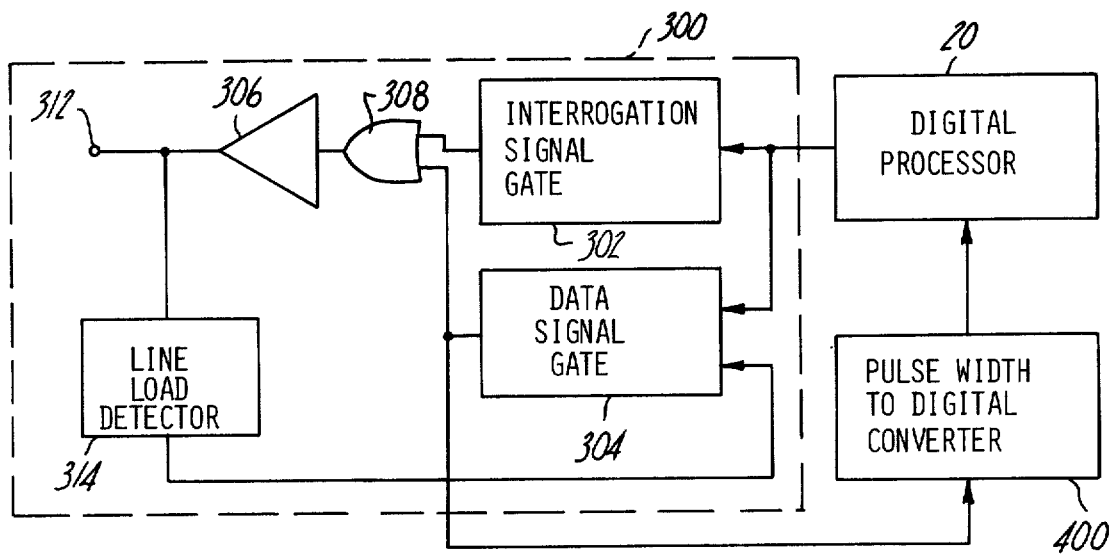
FIG. 8 is a block diagram of the processor and Processor Interface.

Further details of the Gate 300 are shown in the block diagram illustrated in FIG. 8. The interrogation and data signals generated by the Digital Processor 20 are transmitted to the inputs of an Interrogation Signal Gate 302 and a Data Signal Gate 304. The Interrogation Signal Gate 302 only transmits the interrogation signals and the Data Signal Gate 304 only transmits the data signals. The outputs of the Interrogation Signal Gate 302 and the Data Signal Gate 304 are input to an Amplifier 306 through OR Gate 308. The output of Amplifier 306 is transmitted to the Line 12 through an output terminal 312 and to the input of a line Load Detector 314, which detects a change in the load on Line 12 when pulse width converter 140 generates a low impedance to ground. The output generated by the Line Load Detector 314 is applied to the Data Signal Gate 304 and blocks further transmission of the data signal.

The output of the Data Signal Gate 304 is also applied to the Pulse Width to Digital Converter 400 which generates a digital signal indicative of the time duration the data signal is transmitted by the Data Signal Gate 304.

Figure 9:
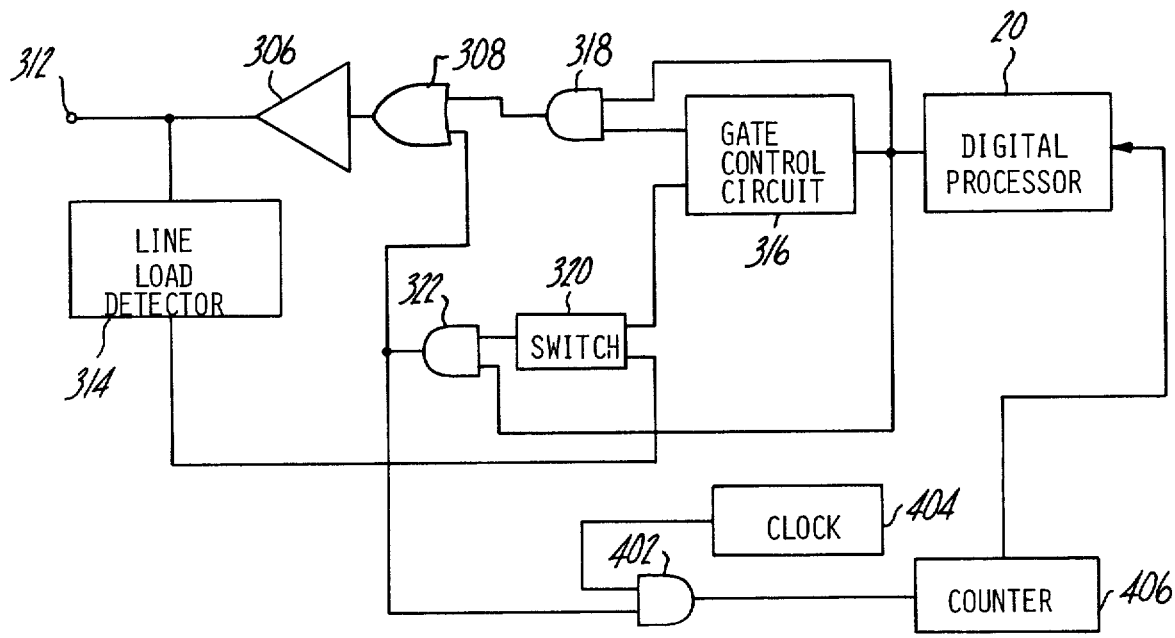
FIG. 9 is a block diagram showing the subcomponents of the Processor Interface.

Further details of the Interrogation Signal Gate 302, the Data Signal Gate 304 and the Pulse Width to Digital Converter 400 are shown in the block diagram illustrated in FIG. 9. The interrogation and data signals generated by the Digital Processor 20 are transmitted to a Gate Control Circuit 316, and input terminals of AND Gates 318 and 322. The Gate Control Circuit 316 in response to the interrogation signal generates a first output signal which is applied to the alternate input terminal of AND gate 318 which activates AND gate 318 to transmit the interrogation signals to amplifier 306 through OR gate 308. After the interrogation signals have been transmitted to Amplifier 306 the first signal is terminated and the Gate Control Circuit 316 generates a second signal which is applied to the SET input of a bistable electronic switch 320 and activates the Switch 320 to produce an output signal activating AND gate 322. The sequentially generated data signal is then passed by AND gate 322 and OR gate 308 to the input of amplifier 306 where it is amplified and output to Line 12 via output terminal 312.

The Line Load Detector 314 detects a line load change when the Pulse Width Converter 140 generates a low impedance to ground, and generates an output signal which resets the Switch 320 to its initial state. This causes AND gate 322 to be deactivated terminating the transmission of the data signal to Amplifier 306 and to Line 12.

The output of AND gate 322 also activates an input of AND gate 402. Clock pulse signals generated by a Clock 404 are received at the alternate input of AND gate 402 and are transmitted to a Counter 406 as long as AND gate 402 is activated by a signal from AND gate 322. The Counter 406 counts the clock pulses received during the period the data signal is passed by AND gate 322. The output of Counter 406 is a digital signal indicative of the number of clock pulses counted.

Figure 10:
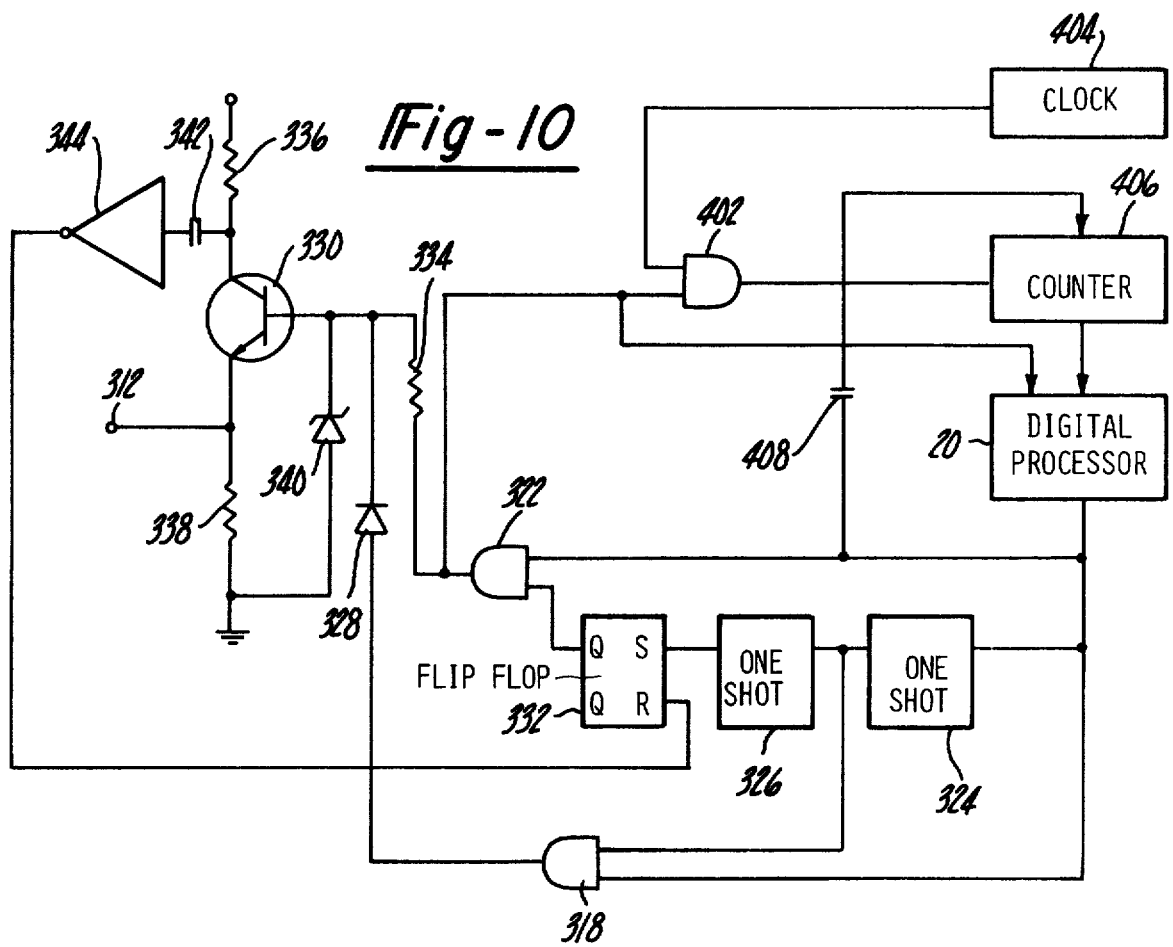
FIG. 10 is a circuit diagram of the preferred embodiment of the Processor Interface.

Circuit details of the Processor Interface 200 are illustrated on FIG. 10. The input of a first One Shot Multivibrator 324 is connected to an output of the Digital Processor 20 and receives the generated interrogation and data signals. The output of multivibrator 324 is connected to the input of a second one shot multivibrator 326 and an input of AND gate 318. Multivibrators 324 and 326 comprise the Gate Control Circuit 316 shown on FIG. 9. Multivibrator 324 produces a signal in response to the leading edge of the first interrogation signal, having a time duration t slightly longer than the time $T_1$ required for the Digital Processor 20 to generate a maximum number of interrogation pulses as shown on FIGS. 5a and 5b. Multivibrator 326 is triggered by the trailing edge of the signal generated by multivibrator 324 and produces a very short pulse having a time duration $\Delta t_2$ as shown on FIG. 5d such that $t + \Delta t_2$ is equal to or less than the time "T" before the Digital Processor 20 generates the data signal. It is recognized that multivibrator 326 may be replaced by a serially connected capacitor and inverter amplifier to produce the same results. The interrogation and data signals from the Digital Processor are also received at the alternate input of AND gate 318. The output of AND gate 318 is connected to the base of a transistor 330 through a diode 328.

The output of the second multivibrator 326 is connected to the SET input of Flip Flop 332. The SET (Q) output of Flip Flop 332 is connected to one input of AND gate 322. The alternate input of AND gate 322 is connected to the output of the Digital Processor 20 and also receives the generated interrogation and data signals. The output of AND gate 322 is connected to one input of AND gate 402, the base of transistor 330 through a resistance 334 and back to the Digital Processor 20. Diode 328 and resistance 334 comprise the OR gate 308 shown on FIGS. 8 and 9.

The collector of transistor 330 is connected to a positive supply of electrical power, designated as B+ on the circuit diagram through a resistance 336 and the emitter of transistor 330 is connected to ground through a resistance 338. The base of transistor 330 is also connected to ground through a zener diode 340. The B+ terminal and ground symbol are used in their conventional manner to designate that the potential at the B+ terminals are more positive than the potential at the circuit points indicated by the ground symbol. The input/output terminal 312 of the circuit is connected to the emitter of transistor 330. One electrode of a capacitance 342 is also connected to the collector of transistor 330 and the opposite electrode is connected to the input of inverter amplifier 344. The output of the inverter amplifier 344 is connected to the RESET input of Flip Flop 332. Capacitance 342 and inverter amplifier 344 comprise the Line Load Detector 314 shown on FIGS. 8 and 9.

The output of the Clock 404 is connected to the alternate input of AND gate 402 and the output of AND gate 402 is connected to the Counter 406. The output of Counter 406 is connected to an input terminal of the Digital Processor 20. One electrode of a capacitance 408 is connected to the output terminal of the Digital Processor 20 and receives the generated interrogation and data signals. The other electrode is connected to the RESET input of Counter 406.

The operation of the Digital Interface 200 illustrated on FIG. 10 is as follows: The Digital Processor 20 generates interrogation signals during the time interval "$T_1$" followed by a data signal after a time interval "$T_2$". The generated interrogation and data signals are applied to multivibrator 324, AND gate 318 and AND gate 322. The leading edge of the first interrogation signal triggers multivibrator 324 to generate an output signal having a duration "t" which activates AND gate 318 to pass the interrogation signals to the base of transistor 330 through diode 328. Transistor 330 amplifies the interrogation signals which are transmitted to the Line 12 by means of terminal 312. After the time interval "t" the output signal generated by multivibrator 324 is terminated. Termination of the output from multivibrator 324 deactivates AND gate 318 and activates multivibrator 326. The output of multivibrator 326 is a short pulse having a duration $\Delta t_2$ which activates Flip Flop 332 to its SET state activating AND gate 322. After the time interval "$T_2$", the Digital Processor generates a data signal for the time interval "$T_3$". The data signal is passed by AND gate 322 providing base current to transistor 330 and activating AND gate 402. AND gate 402 in its active state passes the pulses generated by Clock 404 to Counter 406 which generates a digital signal indicative of the number of clock pulses received. The digital signals generated by the Counter 406 are subsequently transmitted to the digital input of Digital Processor 20 after the data signal being passed by AND gate 322 is terminated. The base current supplied to transistor 330 from AND gate 322 places transistor 330 in the conductive state and a positive data signal appears on Line 12 by means of input/output terminals 312.

The data signal at terminal 312 is transmitted by data Line 12 to the analog to pulse width Converter 140 as shown on FIG. 2. After a period of time determined by the analog signal generated by the Sensor 20, the analog to pulse width Converter 140 generates a low impedance to ground as discussed relative to FIGS. 6 and 7. This low impedance to ground parallels the impedance of resistance 338 and causes an increased current flow through transistor 330, and an increased potential drop across resistance 336. The change in potential across resistance 336 is transmitted by capacitance 342 to the input of inverter amplifier 344 which generates a positive pulse signal triggering Flip Flop 332 to its RESET state. The positive output at the Q output terminal of Flip Flop 332 is terminated and AND gate 322 terminates the base current to transistor 330 and renders it nonconductive. The potential at the input/output terminal 312 now assumes a ground potential. Deactivation of AND gate 322 also deactivates AND gate 402 blocking the transmission of clock pulses to Counter 406, and simultaneously a signal is sent to the Digital Processor 20, signifying that the digital data is ready to be transferred. The capacitance 408 responds to the subsequent termination of the data signal generated by the Digital Processor 20 and produces a signal resetting the Counter 406 to its initial state.

During the generation of the interrogation signals AND gate 318 is activated by the output of multivibrator 324 and the interrogation signals are produced at the input/output terminal 312 by the response of transistor 330 to the signals passed by AND gate 318. AND gates 332 and 402 are blocked by the action of Multivibrators 324 and 326. During the transmission of the data signal, AND gate 318 is blocked by the action of multivibrator 324 and AND gates 322 and 402 are activated by the combined action of multivibrators 324 and 326, and flip flop 332. Zener Diode 340 and Resistance 334 operate as a voltage regulator controlling the potential at terminal 312 through amplifier 330 when the data signal is being transmitted.

Figure 11:
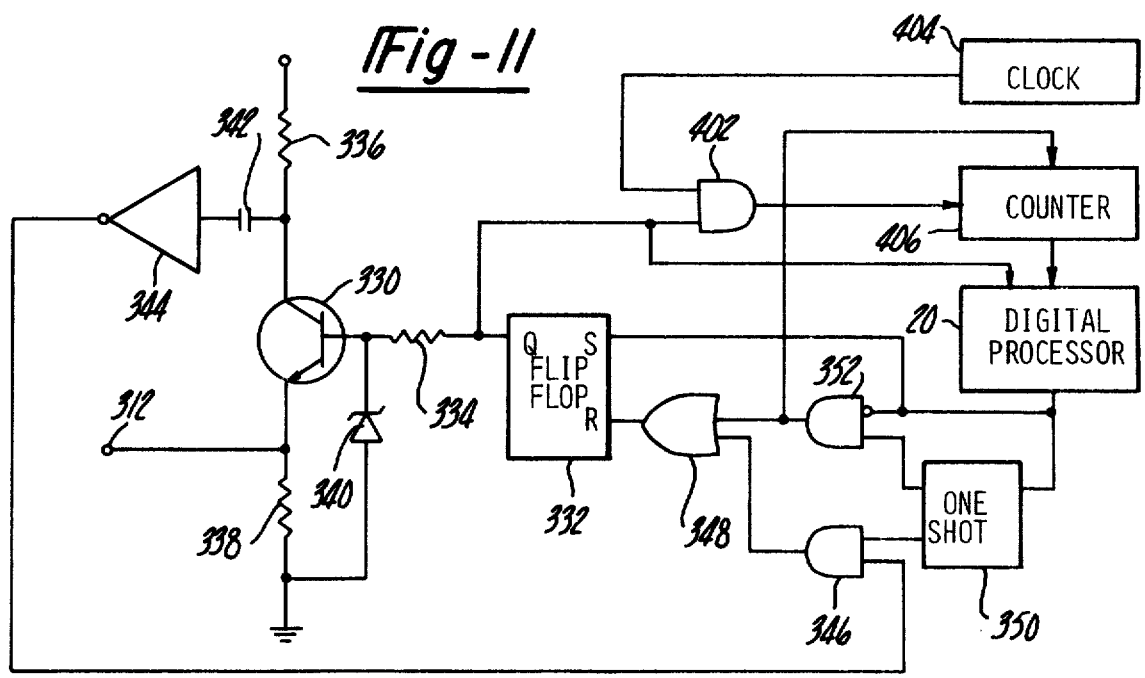
FIG. 11 is a circuit diagram of an alternate embodiment of the Processor Interface.

The circuit details of an alternate embodiment of Processor Interface 200 are illustrated in FIG. 11. The elements of FIG. 11 which are identical to comparable elements of FIG. 10 have the same identifying indicia. The SET input of Flip-Flop 332, a negative (inverted) input to AND gate 352 and the input of one shot multivibrator 350 are connected to the interrogation and data signal output of Digital Processor 20. One output of the one shot multivibrator 350 is connected to the alternate input of AND gate 352 and a second output of one shot multivibrator, outputting a signal which is the reciprocal of the signal output to AND gate 352, is connected to an AND gate 346. The output of inverter amplifier 344 is connected to the alternate input of AND gate 346. The outputs of AND gates 346 and 352 are connected to the RESET terminal of Flip-Flop 332 through OR gate 348. The output of AND gate 352 is also connected to the Counter 406. The set (Q) output of flip-flop 332 is connected to the base of transistor 330 through resistance 334, to AND gate 402, and to the Digital Processor 20. The remainder of the circuit is as described with reference to FIG. 10.

The operation of the processor interface shown in FIG. 11 is as follows. The digital processor 20 generates an interrogation signal followed by a data signal as previously described. The leading edge of each interrogation pulse sets flip-flop 332 and triggers one-shot multivibrator 350. Multivibrator 350 has a time duration slightly greater than an interrogation pulse, as shown in FIG. 4b. In the first portion of the space following each interrogation pulse, AND gate 352 is activated since the inverted signal from the digital processor is now a logic ONE and the output of multivibrator 350 is also a logic ONE. The output of AND gate 352 resets flip-flop 332 through OR gate 348, and resets counter 406.

The leading edge of the data signal generated by the digital processor 20 also sets flip-flop 332 and triggers multivibrator 350. Multivibrator 350 has a time duration less than the data signal, so its output goes to logic ZERO before the inverted signal from the digital processor goes to logic ONE. AND gate 352 is thus not activated, leaving flip-flop 332 SET until reset by a signal from inverter 344 through AND gate 346.

AND gate 346 also keeps the output from inverter 344 from resetting flip-flop 332 prematurely due to turn-on of elements of the decoder and analog-to-pulse-width converter, including flip-flop 114. AND gate 346 allows the output from inverter 344 to reset flip-flop 332 only when multivibrator 350 is not SET. If multivibrator 350 has a period slightly longer than the sum of the periods of multivibrators 118 and 128 of FIG. 3, then it will inhibit resetting of flip-flop 332 due to electrical transients caused by switching of each element of the decoder. A gate similar to gate 346 controlled by suitable signals may be added to the circuits shown on FIGS. 9 and 10 for the same purpose. The remainder of the circuit of FIG. 11 works as described with reference to FIG. 10.

Although the data transmission system has been illustrated and described with reference to specific circuitry and components, it is recognized that one skilled in the art could use other components or conceive different circuit configurations to perform the same functions. Therefore, it is not intended that the scope of the invention be limited to the components and circuits illustrated and discussed in the specification.

What is claimed is:
1. A data transmission system comprising:
digital processor means for processing digital data to produce an output, said digital processor means further including means for periodically generating data request signals having a predetermined pulse duration indicative of a request for new digital data;
sensor means for generating analog data having a value indicative of a sensed condition;
sensor interface means powered by said data request signals for generating a ground signal a determinable time after the beginning of said data request signal in response to said analog data, said ground signal being a low impedance to ground and said determinable time between the beginning of said data request signal and said ground signal being indicative of the value of said analog data;
processor interface means, receiving said data request signals from said digital processor means and said ground signal from said sensor interface means for generating digital data indicative of said determinable time between the beginning of said data request signal and said ground signal; said processor interface means further including means for gating said data request signals to said sensor interface means and means for transmitting said digital data to said digital processor means:
a single data transmission line interconnecting said sensor interface means and said processor interface means for transmitting said data request signal and said ground signal back and forth between said sensor interface means and said processor interface means.

2. The data transmission system of claim 1 wherein said sensor means comprises a plurality of sensors generating analog data indicative of a like plurality of sensed conditions and said sensor interface means comprises a like plurality of associated sensor interface means wherein one associated interface means interfaces each of said plurality of sensor means, and each of said data request signals comprises a sequentially generated coded interrogation signal followed by a data signal where each coded interrogation signal uniquely identifies one associated sensor interface means, each of said associated sensor interface means comprises:

converter means powered by said data signal for generating said ground signal in response to analog data generated by the sensor means associated therewith after a time determinable from the value of said analog signal; and decoder means for transmitting said data signal to said converter means in response to the interrogation signal uniquely identifying said associated sensor interface means, said decoder means further transmitting the ground signal generated by the converter means to said single data transmission line.

3. The data transmission system of claim 2 wherein each of said coded interrogation signals comprises a plurality of interrogation pulses, and each associated sensor interface means is identified by a predetermined number of interrogation pulses, said decoder means comprises first means for generating a switch signal in response to a predetermined number of interrogation pulses and said data signal; and bistable means connected to said data transmission line and receiving said interrogation signals and said data signals, said bistable means having a firt state blocking said interrogation signals and switchable to a second state in response to said switch signal to transmit said data signal to said converter means and to transmit said ground signal to said data transmission line, said bistable means further operative to return to said first state when said data signal is terminated.

4. The data transmission system of claim 3 wherein said first means comprises a shift register having a number of sequential storage locations predetermined by the number of interrogation pulses identifying said associated sensor interface means for sequentially shifting a logical ONE data bit from one storage location to an adjacent storage location in response to each of said interrogation pulses and said data signals;

circuit means for inputting a logical ONE bit of data into the first storage location of said shift register; and gate means responsive to the logical state of the data bit in the last storage location in said shift register and said data signal for generating said switch signal when the state of the bit present in the last storage location of the shift register is a logical ONE and said subsequent data signal is being received;

wherein at the beginning of each coded interrogation signal, the shift register has a logic ONE data bit stored in the first storage location; and wherein said bistable means is a flip flop circuit having a power input terminal, a SET input terminal and a set output terminal, wherein said power input terminal is connected to said data transmission line, said SET input terminal is connected to the output of said gate means and receives said switch signal, and said SET output terminal is connected to said converter means.

5. The data transmission system of claim 4 wherein said means for inputting a logical ONE data bit into the first storage location of said shift register is a means for generating a logic ONE data bit in response to the beginning of said data signal, said logic ONE data bit transmitted to the first storage location of said shift register.

6. The data transmission system of claim 4 wherein the first interrogation pulse of said plurality of interrogation pulses has a pluse duration different from the pulse duration of subsequent interrogation pulses, said means for inputting a logic ONE data bit into the first storage location is a means for generating a logic ONE data bit in response to said first interrogation pulse, said logic ONE data bit transmitted to the first storage location of said shift register.

7. The data transmission system of claim 3 wherein said converter means comprises:

a capacitance for storing an electrical charge, said capacitance having a grounded electrode and an input electrode;

means for controlling a current flow from said data signal from the output of said bistable means to the input electrode of said capacitance in response to said analog signal, said current flow charging said capacitance at a rate determined by the value of said analog signal;

means for detecting the charge on said capacitance and for generating a low inpedance between the output of said bistable means and a ground potential to generate said ground signal when the charge on said capacitance exceeds a predetermined value; and a diode connected between the input electrode of said capacitance and the output of said bistable means to discharge said capacitance when the data signal on the output of said bistable means is terminated.

8. The data transmission system of claim 2 wherein said processor interface means comprises:

interrogation signal gate means sequentially receiving said interrogation and data signals from said digital procesor for selectively transmitting only said interrogation signals, said interrogation signal gate means having a first state transmitting said interrogation signals in response to said interrogation signal, and switching to a second state blocking the transmission of said subsequent data signals in response to the termination of said interrogation signal;

data signal gate means sequentially receiving said interrogation and data signals from said digital procesor for selectively transmitting said data signal, said data signal gate means having a first state in response to the first interrogation signal, blocking the transmission of said interrogation signals and switching to a second state transmitting said data signal in response to said data signal;

amplifier means receiving the interrogation signals transmitted by said interrogation signal gate means and the data signal transmitted by said data gate means for amplifying and transmitting said interrogation and data signals to said data transmission line, line load detector means in circuit relationship with said amplifier means, for generating a switch signal in response to a change in the impedance of said sensor interface means, said switch signal operative to switch said data signal gate means to said first state terminating the transmission of said data signal to said amplifier means; and pulse width-to-digital converter means for generating digital data in response to the data signal transmitted by said data signal gate means.

9. The data transmission system of claim 8 wherein said interrogation signal is generated within a first predetermined time interval and said data signal is generated in a subsequent time interval, said interrogation signal gate means and said data signal gate means comprises;

gate control circuit means for generating a first gate signal for said first predetermined time interval in response to said interrogation signal and for generating a second gate signal after the termination of said first predetermined time interval;

a first gate circuit receiving said interrogation signal and said data signal for transmitting only said interrogation signal in response to said first gate signal; and a second gate circuit receiving said interrogation signal and said data signal for transmitting only said data signal in response to said second gate signal;

wherein said first gate circuit and said gate control means comprises said interrogation signal gate means, and said second gate circuit and said control means comprises said data signal gate means.

10. The data transmission system of claim 9 wherein gate control circuit means comprises:

a first one shot multivibrator means for generating said first gate signal in response to said interrogation signal; and a second one shot multivibrator means for generating said second gate signal in response to the termination of said first gate signal.

11. The data transmission system of claim 10 wherein said interrogation signal comprises a plurality of interrogation pulse signals and each of said sensor interface means is uniquely identified by a predetermined number of interrogation pulse signals;

said first one shot multivibrator means generates said first gate signal in response to the leading edge of the first interrogation pulse signal in said predetermined number of interrogation pulse signals.

12. The data transmission system of claim 9 wherein said interrogation signal comprises a plurality of interrogation pulse signals and each of said sensor interface means is uniquely identified by a predetermined number of interrogation pulse signals and said gate control circuit means comprises:

a one shot multivibrator, triggered by said interrogation pulse signals and said data signals for generating an output pulse signal in response to the leading edge of said interrogation pulse signals and said data signals a predetermined time after being triggered, said predetermined time being slightly longer than the duration of said interrogation pulse signals;

an AND gate receiving inverted interrogation pulse signals and said output pulse signals for transmitting said inverted pulse signals; and a flip-flop circuit having a first state generating an output in response to said interrogation pulse signals and said data signals and a second state, terminating said output signal in response to said inverted interrogation pulse signals transmitted by said AND gate.

13. The data transmission system of claim 8 wherein:

said data signal gate means further includes a bi-stable electronic switch having a first stable state transmitting said data signal and switchable to a second stable state blocking the transmission of said data signal in response to a reset signal; and said line load detector comprises:

a capacitance having one electrode in circuit relationship with said amplifier means to transmit a load signal indicative of a change in the load on said data transmission line;

an amplifier circuit in circuit relationship with the other electrode of said capacitance for generating said reset signal in response to said load signal.

14. The data transmission system of claim 8 wherein said pulse width to digital converter means comprises:

a clock generating clock pulses at a high frequency;

a clock gate circuit for transmitting said clock pulses in response to the data signal transmitted by said data signal gate means; and means for generating digital data indicative of the number clock pulses received from said clock gate circuit while said clock gate is activated by data signal.

15. A data transmission system for providing digital data to a digital processor having means for generating data request signals indicative of a request for new digital data, comprising:

sensor means for generating analog data having a value indicative of a sensed condition;

sensor interface means receiving said analog data and powered by said data request signals for generating a ground signal a determinable time after receiving said data request signal in response to said analog data, said ground signal being indicative of a low impedance to ground, and said determinable time between the beginning of said request signal and said ground signal being indicative of the value of said analog data;

processor interface means receiving said data request signal from the digital processor and said ground signal from said sensor interface means for generating digital data indicative of said determinable time between the beginning of said data request signal and said ground signal; said processor interface means further including means for gating said data request signals to said sensor interface means and means for transmitting said digital data to the digital processor; and a single data transmission line interconnecting said sensor interface means and said processor interface means for transmitting said data request signals and said ground signals back and forth between said sensor interface means and said processor interface means.

16. The system of claim 15 wherein said sensor means comprises a plurality of sensors generating analog data indicative of a like plurality of sensed conditions and said sensor interface means comprises a like plurality of associated sensor interface means wherein one associated interface means interfaces each of said plurality of sensor means, and each of said data request signals comprises a sequentially generated coded interrogation signal followed by a data signal where each coded interrogation signal uniquely identifies one associated sensor interface means, said associated sensor interface means comprises:
- converter means powered by said data signal for generating said ground signal in response to analog data generated by the sensor means associated therewith after a time determinable from the value of said analog signal; and
- decoder means for transmitting said data signal to said converter means in response to the interrogation signal uniquely identifying said associated sensor interface means, said decoder means further transmitting the ground signal generated by the converter means to said single data transmission line.

17. The system of claim 16 wherein each of said coded interrogation signals comprises a plurality of interrogation pulses, and each associated sensor interface means is identified by a predetermined number of interrogation pulses, said decoder means comprises
- first means for generating a switch signal in response to a predetermined number of interrogation pulses and said data signal; and
- bistable means connected to said data transmission line and receiving said interrogation signals and said data signals, said bistable means having a first state blocking said interrogation signals and switchable to a second state in response to said switch signal to transmit said data signal to said converter means and to transmit said ground signal to said data transmission line, said bistable means further operative to return to said first state when said data signal is terminated.

18. The system of claim 17 wherein said converter means comprises:
- a capacitance for storing an electrical charge, said capacitance having a grounded electrode and an input electrode;
- means for controlling a current flow from said data signal from the output of said bistable means to the input electrode of said capacitance in response to said analog signal, said current flow charging said capacitance at a rate determined by the value of said analog signal;
- means for detecting the charge on said capacitance and for generating a low impedance between the output of said bistable means and a ground potential to generate said ground signal when the charge on said capacitance exceeds a predetermined value; and
- a diode connected between the input electrode of said capacitance and the output of said bistable means to discharge said capacitance when the data signal on the output of said bistable means is terminated.

19. The system of claim 18 wherein said processor interface means comprises:
- interrogation signal gate means sequentially receiving said interrogation and data signals from said digital processor for selectively transmitting only said interrogation signals, said interrogation signal gate means having a first state transmitting said interrogation signals in response to said interrogation signal, and switching to a second state blocking the transmission of said subsequent data signals in response to the termination of said interrogation signal;
- data signal gate means sequentially receiving said interrogation and data signals from said digital processor for selectively transmitting said data signal, said data signal gate means having a first state in response to the first interrogation signal, blocking the transmission of said interrogation signals and switching to a second state transmitting said data signal in response to said data signal;
- amplifier means receiving the interrogation signals transmitted by said interrogation signal gate means and the data signal transmitted by said data gate means for amplifying and transmitting said interrogation and data signals to said data transmission line,
- line load detector means in circuit relationship with said amplifier means, for generating a switch signal in response to a change in the impedance of said sensor interface means, said switch signal operative to switch said data signal gate means to said first state terminating the transmission of said data signal to said amplifier means; and
- pulse width-to-digital converter means for generating digital data in response to the data signal transmitted by said data signal gate means.

20. The system of claim 19 wherein said interrogation signal is generated within a first predetermined time interval and said data signal is generated in a subsequent time interval, said interrogation signal gate means and said data signal gate means comprises;
- gate control circuit means for generating a first gate signal for said first predetermined time interval in response to said interrogation signal and for generating a second gate signal after the termination of said first predetermined time interval;
- a first gate circuit receiving said interrogation signal and said data signal for transmitting only said interrogation signal in response to said first gate signal; and
- a second gate circuit receiving said interrogation signal and said data signal for transmitting only said data signal in response to said second gate signal;
- wherein said first gate circuit and said gate control means comprises said interrogation signal gate means, and said second gate circuit and said gate control means comprises said data signal gate means.

21. In combination with a digital processor for processing digital data and sensor means generating analog data, wherein the digital processor includes means for generating data request signals requesting new input data and the sensor means generates analog data having a value indicative of sensed conditions, a data transmission system comprising:
- sensor interface means powered by said data request signals for generating a ground signal a determinable time after receiving said data request signal in response to said analog data, said ground signal being indicative of a low impedance to ground, and said determinable time between the beginning of said data request signal and said ground signal being indicative of the value of said received analog data;
- processor interface means, receiving said data request signal from the digital processor and said ground signal from said sensor interface means for generating digital data indicative of said determinable time between the beginning of said data request signal and said ground signal; said processor interface means further including means for gating said data request signals to said sensor interface means and means for transmitting said digital data to the digital processor; and a single data transmission line interconnecting said sensor interface means and said processor interface means for transmitting said data request signals and said ground signals back and forth between said sensor interface means and said processor interface means.

22. The combination of claim 21 wherein said sensor means comprises a plurality of sensors generating analog data indicative of a like plurality of sensed conditions and said sensor interface means comprises a like plurality of associated sensor interface means wherein one associated interface means interfaces each of said plurality of sensor means, and each of said data request signals comprises a sequentially generated coded interrogation signal followed by a data signal where each coded interrogation signal uniquely identifies one associated sensor interface means, said associated sensor interface means comprises:

converter means powered by said data signal for generating said ground signal in response to analog data generated by the sensor means associated therewith after a time determinable from the value of said analog signal; and decoder means for transmitting said data signal to said converter means in response to the interrogation signal uniquely identifying said associated sensor interface means, said decoder means further transmitting the ground signal generated by the converter means to said single data transmission line.

23. The combination of claim 22 wherein each of said coded interrogation signals comprises a plurality of interrogation pulses, and each associated sensor interface means is identified by a predetermined number of interrogation pulses, said decoder means comprises first means for generating a switch signal in response to a predetermined number of interrogation pulses and said data signal; and bistable means connected to said data transmission line and receiving said interrogation signals and said data signals, said bistable means having a first state blocking said interrogation signals and switchable to a second state in response to said switch signal to transmit said data signal to said converter means and to transmit said ground signal to said data transmission line, said bistable means further operative to return to said first state when said data signal is terminated.

24. The combination of claim 23 wherein said first means comprises a shift register having a number of sequential storage locations predetermined by the number of interrogtion pulses identifying said associated sensor interface means for sequentially shifting a logical ONE data bit from one storage location to an adjacent storage location in response to each of said interrogation pulses and said data signals;

circuit means for inputting a logical ONE bit of data into the first storage location of said shift register; and gate means responsive to the logical state of the data bit in the last storage location in said shift register and said data signal for generating said switch signal when the state of the bit present in the last storage location of the shift register is a logical ONE and said subsequent data signal is being received;

wherein at the beginning of each coded interrogation signal, the shift register has a logic ONE data bit stored in the first storage location; and wherein said bistable means is a flip flop circuit having a power input terminal, a SET input terminal and a SET output terminal, wherein said power input terminal is connected to said data transmission line, said SET input terminal is connected to the output of said gate means and receives said switch signal, and said SET output terminal is connected to said converter means.

25. The combination of claim 24 wherein said converter means comprises:

a capacitance for storing an electrical charge, said capacitance having a grounded electrode and an input electrode;

means for controlling a current flow of said data signal from the output of said bistable means to the input electrode of said capacitance in response to said analog signal, said current flow charging said capacitance at a rate determined by the value of said analog signal;

means for detecting the charge on said capacitance for generating a low impedance between the output of said bistable means and a ground potential to generate said ground signal when the charge on said capacitance exceeds a predetermined value; and a diode connected between the input electrode of said capacitance and the output of said bistable means to discharge said capacitance when the data signal on the output of said bistable means is terminated.

26. The combination of claim 25 wherein said processor interface means comprises:

interrogation signal gate means sequentially receiving said interrogation and data signals from said digital processor for selectively transmitting only said interrogation signals, said interrogation signal gate means having a first state transmitting said interrogation signals in response to said interrogation signal, and switching to a second state blocking the transmission of said subsequent data signals in response to the termination of said interrogation signal;

data signal gate means sequentially receiving said interrogation and data signals from said digital processor for selectively transmitting said data signal, said data signal gate means having a first state in response to the first interrogation signal, blocking the transmission of said interrogation signals and switching to a second state transmitting said data signal in response to said data signal;

amplifier means receiving the interrogation signals transmitted by said interrogation signal gate means and the data signal transmitted by said data gate means for amplifying and transmitting said interrogation and data signals to said data transmission line;

line load detector means in circuit relationship with said amplifier means, for generating a switch signal in response to a change in the impedance of said sensor interface means, said switch signal operative to switch said data signal gate means to said first state terminating the transmission of said data signal to said amplifier means; and pulse width-to-digital converter means for generating digital data in response to the data signal transmitted by said data signal gate means.

27. The combination of claim 26 wherein said interrogation signal is generated within a first predetermined time interval and said data signal is generated in a subsequent time interval, said interrogation signal gate means and said data signal gate means comprises;

gate control circuit means for generating a first gate signal for said first predetermined time interval in response to said interrogation signal and for generating a second gate signal after the termination of said first predetermined time interval;

a first gate circuit receiving said interrogation signal and said data signal for transmitting only said interrogation signal in response to said first gate signal; and a second gate circuit receiving said interrogation signal and said data signal for transmitting only said data signal in response to said second gate signal;

wherein said first gate circuit and said gate control means comprises said interrogation signal gate means, and said second gate circuit and said gate control means comprises said data signal gate means.

28. In combination with a digital processor for processing digital data to produce an output and a plurality of sensors generating output data indicative of sensed conditions, wherein said digital processor includes means for generating data request signals indicative of requests for new data from the sensor, each of such data request signals comprising an interrogation signal uniquely identifying the particular sensor from which new data is requested, followed by a data signal an improved data transmission system comprising:

interrogation signal gate means sequentially receiving said interrogation and data signals from said digital processor for selectively transmitting only said interrogation signals, said interrogation signal gate means having a first state transmitting only said interrogation signals and switching to a second state in response to said data signal blocking the transmission of said subsequent data signals;

data signal gate means sequentially receiving said interrogation signal and said data signals from the digital processor for selectively transmitting only said data signals, said data signal gate means having a first state in response to said interrogation signal blocking the transmission of said interrogation signals and switching to a second state in response to said data signal transmitting said data signals;

amplifier means having an input and an output, said amplifier means receiving at said input the interrogation signals transmitted by the interrogation signal gate means and the data signal transmitted by the data gate means for amplifying and transmitting said interrogation and data signals via said output;

line load detector means in circuit relationship with said amplifier means for generating a switch signal in response to a change in the impedance at the output of the amplifier means, said switch signal operative to switch said data signal gate means to said first state terminating the transmission of said data signal to said amplifier means;

pulse width to digital converter means for generating digital data in response to the data signal transmitted by said data signal gate means;

a single data transmission line connected to the output of said amplifier means for transmitting said interrogation and data signals;

converter means powered by said data signal for generating a ground signal indicative of a low impedance to ground in response to the output data of said sensors at a time determinable from the value of said output data and wherein one converter means is associated with each of said plurality of sensors and is associated therewith; and decoder means connected to said single data transmission line for transmitting said data signal to said converter means in response to the interrogation signal uniquely identifying the sensor associated with said converter means, said decoder means further transmitting said ground signals generated by the converter means to the output of said amplifier means via said single data transmission line.

29. The combination of claim 28 wherein each interrogation signal comprises a predetermined number of short pulse signals wherein the predetermined number of pulses in each interrogation signal uniquely identifies the sensor from which new data is requested, said decoder means comprises shift register means, having a number of sequential storage locations predetermined by the number of pulses in the interrogation signal identifying the particular sensor associated with said decoder means, said shift register means sequentially shifting a logical ONE data bit from one storage location to an adjacent storage location in response to each of said interrogation pulses, said shift register means further storing the logical ONE data bit in the last storage location when the interrogation signal identifying the particular sensor associated with the decoder means is received;

bistable means connected to said data transmission line and receiving said interrogation signals and said data signals for generating a logical ONE data bit in response to receiving said data signal;

an AND gate for generating a signal in response to a logical ONE data bit generated by said bistable means and the presence of a logical ONE data bit in last storage location of the shift register;

a flip-flop circuit having a first state upon the application of electrical power and switchable to a second state in response to the signal generated by said AND gate, said flip flop circuit transmitting said data signal to said converter means; and means for inputing a logical ONE data bit into the first storage location of said shift register in response to a logical ONE data bit being generated by said bistable means.

30. A method for transmitting data between a digital processor and a plurality of sensors for generating sensor data indicative of sensed conditions, wherein said digital processor includes means for sequentially generating data request signals indicative of requests for new data from the sensors, wherein each of said data request signals comprises an interrogation signal uniquely identifying the particular sensor from which the new data is requested followed by a data signal, comprising the steps of:

gating the data request signal generated by the digital processor with gate means to separately transmit the interrogation signal from the data signal;

sequentially amplifying said interrogation and data signals to generate amplifier interrogation and data signals;

detecting a change in the amplified data signal by means of a line load detector to generate a switch signal;

deactivating said gate means with said switch signal to terminate the transmission of said data signal;

gating clock pulses to a counter with said data signal to convert said data signals to digital data;

transmitting said digital data to said digital processor in response to the termination of the transmission of said data signal;

transmitting said amplified interrogation and data signals to remote decoder means via a single data transmission line;

decoding said interrogation signal with said decoder means, to activate a switch transmitting said data signal to an associated converter means when the interrogation signal identifies the sensor associated with the decoder means;

generating a ground signal by means of said converter means when the integrated value of the sensor data generated by the sensor associated therewith reaches a predetermined value, said ground signal indicative of a low impedance to ground, transmitting said ground signal back to said line load detector via said single data transmission line whereby said ground signal is detected by said line load detector which generates a switch signal terminating the transmission of said clock signal to said counter.

* * * * *

UNITED STATES PATENT AND TRADEMARK OFFICE
CERTIFICATE OF CORRECTION

PATENT NO. : 4,103,337

DATED : July 25, 1978

INVENTOR(S) : Arliss E. Whiteside

It is certified that error appears in the above-identified patent and that said Letters Patent are hereby corrected as shown below:

Column 3:  Figure 4b:  line 5, insert "one" before "shot"

Column 3:  Line 64:  "indentifies" should be "identifies"

Column 5:  Line 42:  "Figure 4le" should be "Figure 4e"

Column 5:  Line 49:  "Figure 4lb" should be "Figure 4b"

Column 10: Line 64:  "terminals" should be "terminal"

UNITED STATES PATENT AND TRADEMARK OFFICE
CERTIFICATE OF CORRECTION

PATENT NO. : 4,103,337
DATED : July 25, 1978
INVENTOR(S) : Arliss E. Whiteside

It is certified that error appears in the above-identified patent and that said Letters Patent are hereby corrected as shown below:

Column 13: Claim 3: Line 36: "firt" should be "first"

Column 14: Claim 6: Line 15: "pluse" should be "pulse"

Column 14: Claim 7: Line 34: "inpedance" should be "impedance"

Column 14: Claim 8: Line 47: "procesor: should be "processor"

Column 14: Claim 8: Line 57: "procesor" should be "processor"

Column 15: Claim 9: Line 31: before "control" add "gate"

Column 16: Claim 15: Line 41: before "request" add "data"

Signed and Sealed this

Sixteenth Day of October 1979

[SEAL]

Attest:

RUTH C. MASON
Attesting Officer

LUTRELLE F. PARKER
Acting Commissioner of Patents and Trademarks